US011968515B2

(12) United States Patent
Xiao et al.

(10) Patent No.: US 11,968,515 B2
(45) Date of Patent: Apr. 23, 2024

(54) MULTIFUNCTIONAL SOUNDING DEVICE

(71) Applicant: AAC Microtech (Changzhou) Co., Ltd., Changzhou (CN)

(72) Inventors: Bo Xiao, Shenzhen (CN); Chenliang Kong, Shenzhen (CN); Tong Zhang, Shenzhen (CN); Ronglin Linghu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 200 days.

(21) Appl. No.: 17/833,920

(22) Filed: Jun. 7, 2022

(65) Prior Publication Data

US 2023/0319483 A1 Oct. 5, 2023

(30) Foreign Application Priority Data

Mar. 29, 2022 (CN) ......................... 202220721213.3

(51) Int. Cl.
*H04R 9/02* (2006.01)
*H04R 1/02* (2006.01)
*H04R 3/00* (2006.01)
*H04R 9/04* (2006.01)
*H04R 9/06* (2006.01)

(52) U.S. Cl.
CPC ............. *H04R 9/063* (2013.01); *H04R 1/025* (2013.01); *H04R 3/00* (2013.01); *H04R 9/025* (2013.01); *H04R 9/045* (2013.01); *H04R 2400/11* (2013.01)

(58) Field of Classification Search
USPC .......................................... 381/117, 396, 400
See application file for complete search history.

(56) References Cited

U.S. PATENT DOCUMENTS

| | | | | |
|---|---|---|---|---|
| 2012/0153748 A1* | 6/2012 | Wauke | .................. | H02K 33/16<br>310/25 |
| 2019/0020954 A1* | 1/2019 | Liu | ........................ | H04R 9/025 |

* cited by examiner

*Primary Examiner* — James K Mooney
(74) *Attorney, Agent, or Firm* — W&G Law Group

(57) ABSTRACT

The present invention provides a multifunctional sounding device including a housing, a first vibration system, a second vibration system, a magnetic circuit system, an elastic component and a flexible circuit board. The elastic component includes a deformation part fixed to the second vibration system and an installation part extended from both ends of the deformation part and fixed to the housing. The second vibration system is suspended in the containment cavity through the elastic component. The flexible circuit board is connected with the elastic component, so that the vibration of the flexible circuit board is coupled with the vibration of the elastic component. Therefore, the damping of the elastic component is reduced, the force received by the elastic component during vibration is reduced, and the service life of the elastic component is extended.

10 Claims, 9 Drawing Sheets

MULTIFUNCTIONAL SOUNDING DEVICE

FIELD OF THE PRESENT DISCLOSURE

The invention relates to the technical field of electro-acoustic transducers, in particular to a multifunctional sounding device.

DESCRIPTION OF RELATED ART

The related multifunctional sounding device includes a housing, a first vibration system, a second vibration system, a magnetic circuit system, an elastic component and a flexible circuit board. When the multifunctional sounding device works, the magnetic circuit system can drive the first vibration system to vibrate and sound, and the magnetic circuit system can drive the second vibration system to vibrate. Wherein, the elastic component can facilitate the motion recovery of the second vibration system, and the flexible circuit board provides electric signals for the first vibration system and the second vibration system. Usually, the elastic component and the flexible circuit board vibrate independently of each other. the elastic component has large vibration damping and short life.

Therefore, it is necessary to provide a multifunctional sounding device to prolong the service life of elastic components.

SUMMARY OF THE PRESENT INVENTION

The purpose of the present invention is to provide a multifunctional sounding device with improved stability.

Accordingly, the present invention provides a multifunctional sounding device, including: a housing with a containment cavity; a first vibration system movable along a first direction relative to the housing; a second vibration system connected to the housing and movable along a second direction and/or in a third direction relative to the housing; the second direction being perpendicular to the first direction, and the third direction being perpendicular to both the first direction and the second direction; a magnetic circuit system connected with the housing for driving the first vibration system and the second vibration system; an elastic component including a deformation part fixed on the second vibration system and an installation part extended from both ends of the deformation part and fixed on the housing for suspending the second vibration system in the containment cavity; a flexible circuit board including an attached part attached to the deformation part and an extension part bent and extended from the attached part and at least partially located outside the containment cavity.

Further, the deformation part includes a fixed arm fixed to the second vibration system and an elastic arm part extending from both ends of the fixed arm; the attached part includes the fixed part fixed on the fixed arm and a connection arm extending from one end of the fixed part and attached to the elastic arm part; a width of the connection arm along the first direction is less than or equal to the width of the elastic arm part along the first direction.

Further, the extension part includes a first bending part located outside the containment cavity, a second bending part connected to the first bending part and extending in a curve and folded manner along the second direction part and a third bending part connected to the second bending part and extending in a curve and folded manner along the first direction; the attached part is connected to an end of the third bending part away from the second bending part.

In addition, the multifunctional sounding device further includes a connection component, wherein the flexible circuit board and the elastic component are connected through the connection component.

In addition, the attached part is fixed on the side of the deformation part away from the second vibration system, the connection component is arranged between the end of the attached part away from the extension part and the deformation part.

In addition, the number of the elastic components is multiple, and along the second direction and/or along the third direction, the elastic components are symmetrical disposed.

In addition, the second vibration system includes a drive coil and a weight, and the weight penetrates to form a first through hole; the drive coil is accommodated in the first through hole and is disposed opposite to the magnetic circuit system at a distance; the drive coil and the magnetic circuit system interact to drive the weight to vibrate along the second direction and/or along the third direction; the deformation part of the elastic component is fixed to the weight.

In addition, the weight is arranged with a bottom wall and a side wall bent and extended in a curve and folded manner from the bottom wall toward the first vibration system, the deformation of the elastic component part is fixed to the side wall.

In addition, the housing includes a first housing, a second housing and a cover plate which are connected in sequence; the first housing, the second housing and the cover plate enclose the containment cavity; the bottom wall penetrates to form a second through hole; the cover plate protrudes toward the magnetic circuit system corresponding to the position of the second through hole to form a protruding platform; the magnetic circuit system is fixed on the protruding platform.

In addition, the cover plate is provided with an extension part of cover plate extending outside the containment cavity, and the extension part is fixed on the extension part of cover plate.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

The application provides an electronic equipment, which includes a body and a multifunctional sounding device installed on the body. When the multifunctional sounding device is working, the user can control the multifunctional sounding device to sound and/or vibration as required, so as to improve the user experience.

Figure 1:
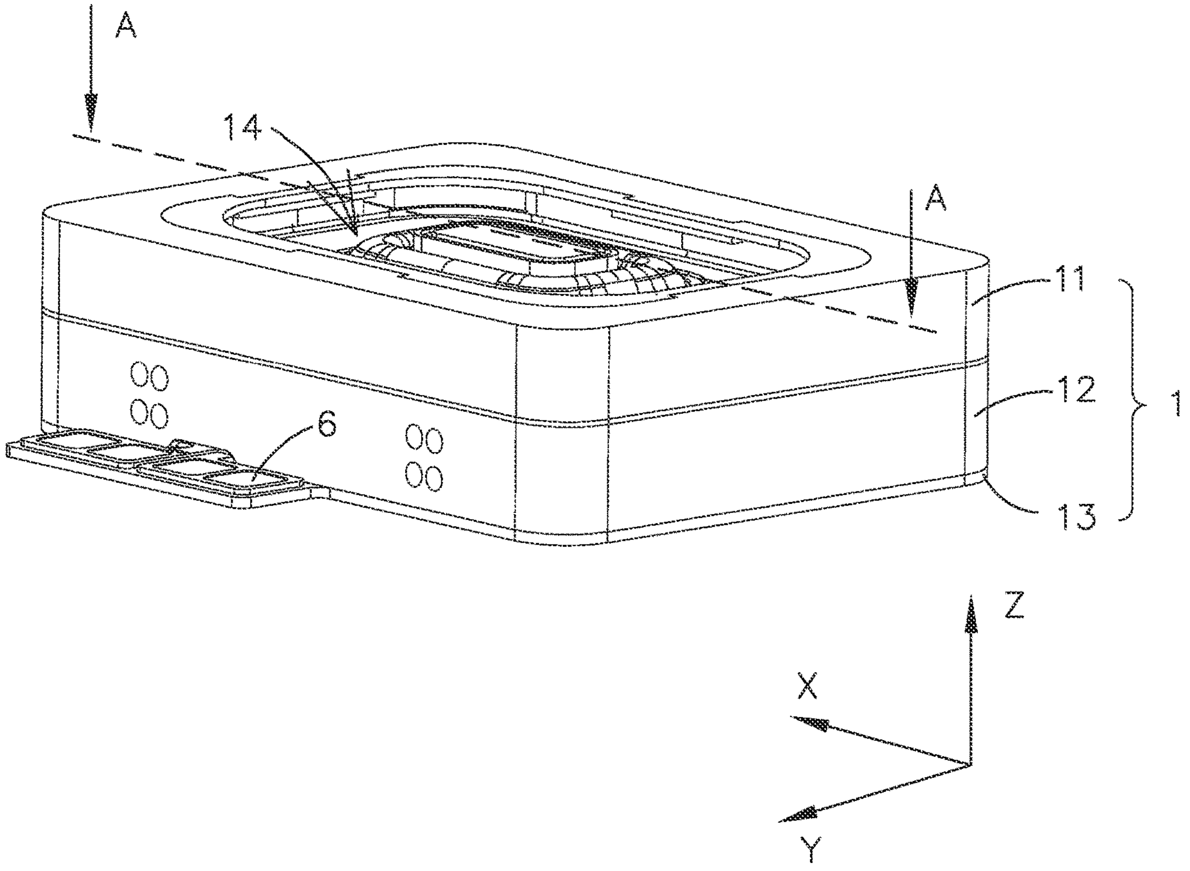
FIG. 1 is an isometric view of a multifunctional sounding device in accordance with an embodiment of the present invention.

As shown in FIG. 1, a first direction Z, a second direction X and a third direction Y are defined, and first direction Z is the vibration direction of the first vibration system 2. The second direction X and/or the third direction Y are the vibration directions of the second vibration system 3. The second direction X is perpendicular to the first direction Z, and the third direction Y is perpendicular to both the first direction and the second direction.

Figure 2:
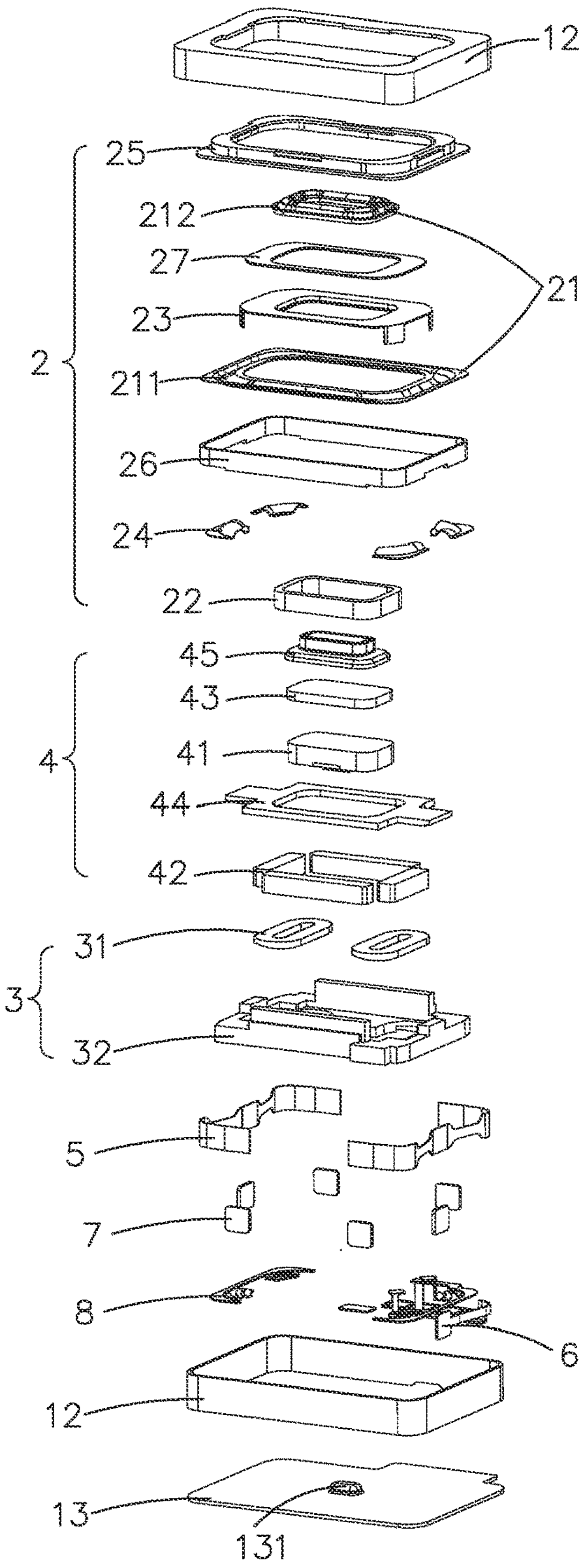
FIG. 2 is as exploded view of the multifunctional sounding device in FIG. 1.

Specifically, as shown in FIG. 1 and FIG. 2, the multifunctional sounding device includes: a housing 1, a first vibration system 2, a second vibration system 3, a magnetic circuit system 4, a flexible circuit board 6 and an elastic component 5. The magnetic circuit system 4 is connected to the housing 1, and the first vibration system 2 is suspended in the containment cavity 14 of the housing 1 through the magnetic circuit system 4.

As shown in FIG. 2, FIG. 10~FIG. 12, the elastic component 5 includes a deformation part 51 fixed to the second vibration system 3 and an installation part 52 extending from both ends of the deformation part 51 and fixed to the housing 1. The second vibration system 3 is suspended in the containment cavity 14 through the elastic component 5. As shown in FIG. 2, the multifunctional sounding device also includes an elastic support assembly 8. Both the flexible circuit board 6 and the elastic support assembly 8 are used to connect the multifunctional sounding device with external electronic parts, so as to facilitate the use of the multifunctional sounding device. Wherein, the magnetic circuit system 4 is used to drive the first vibration system 2 to vibrate along the first direction Z to sound, and the magnetic circuit system 4 is used to drive the second vibration system 3 to vibrate along the second direction X and/or along the third direction Y. The multifunctional sounding device is arranged with both a vibration feedback function and a voice feedback function, thereby improving the performance of the multifunctional sounding device.

As shown in FIG. 1 and FIG. 2, the housing 1 includes a first housing 11, a second housing 12 and a cover plate 13 which are connected in sequence. The first housing 11, the second housing 12 and the cover plate 13 enclose a containment cavity. The first housing 11 and the second housing 12 are fixedly or detachably connected. The second housing 12 is fixedly or detachably connected to the cover plate 13. The housing 1 is divided into a first housing 11, a second housing 12 and a cover plate 13, and the first housing 11 and the second housing 12 are detachably connected, and the second housing 12 and the cover plate 13 are detachably connected. It can facilitate the installation, maintenance and replacement of the internal parts of the containment cavity, thereby extending the service life of the multifunctional sounding device. The first housing 11 is fixedly connected with the second housing 12, and the second housing 12 is fixedly connected with the cover plate 13, which can increase the stability of the connection between the first housing 11 and the second housing 12, and the second housing 12 and the cover plate 13.

As shown in FIG. 2, the magnetic circuit system 4 includes a main magnet 41 and a secondary magnet 42, and the secondary magnet 42 is arranged around the main magnet 41 to form a magnetic gap. The magnetic circuit system 4 further includes a main pole core 43 attached to the main magnet 41, a secondary pole core 44 attached to the secondary magnet 42 surrounding the main pole core 43, and an upper magnet 45 attached to the main pole core 43 away from the main magnet 41. The secondary magnet 42 is installed in the containment cavity 14 of the housing 1 through the secondary pole core 44, the installation of secondary magnet 42 is simplified, the number of parts required for secondary magnet 42 installation is reduced, the space of the containment cavity 14 occupied by the installation of the secondary magnet 42 is thus reduced, this in turn reduces the size of the multifunctional sounding device. While reducing the production cost of the multifunctional sounding device, the space required for the installation of the multifunctional sounding device is reduced, so as to facilitate the installation and application of the multifunctional sounding device.

Figure 3:
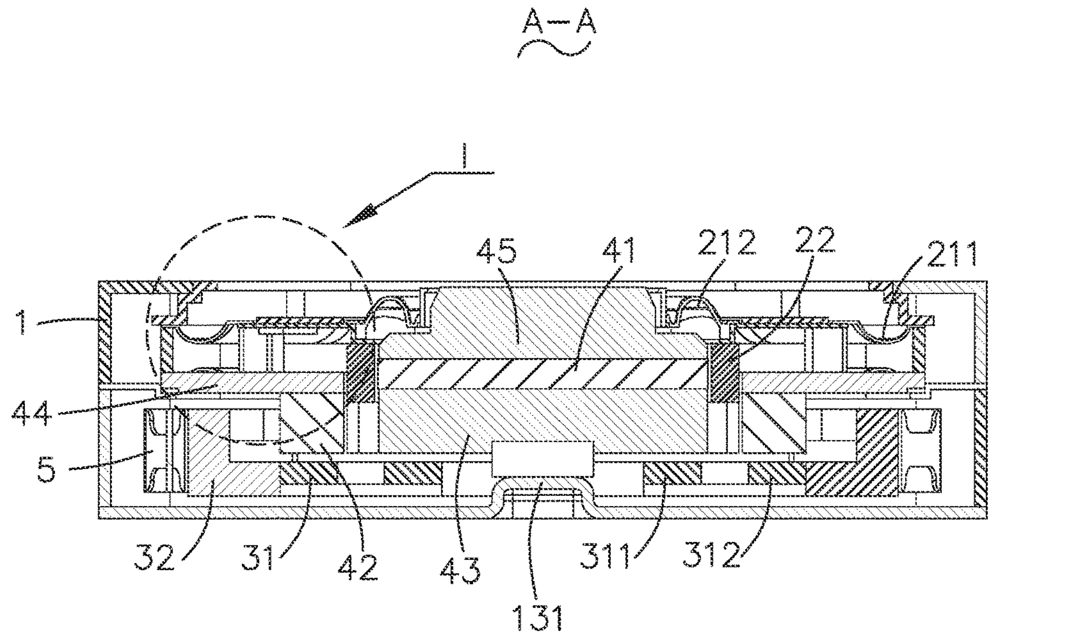
FIG. 3 is a sectional view of the multifunctional sounding device taken along line AA in FIG. 1.
Figure 4:
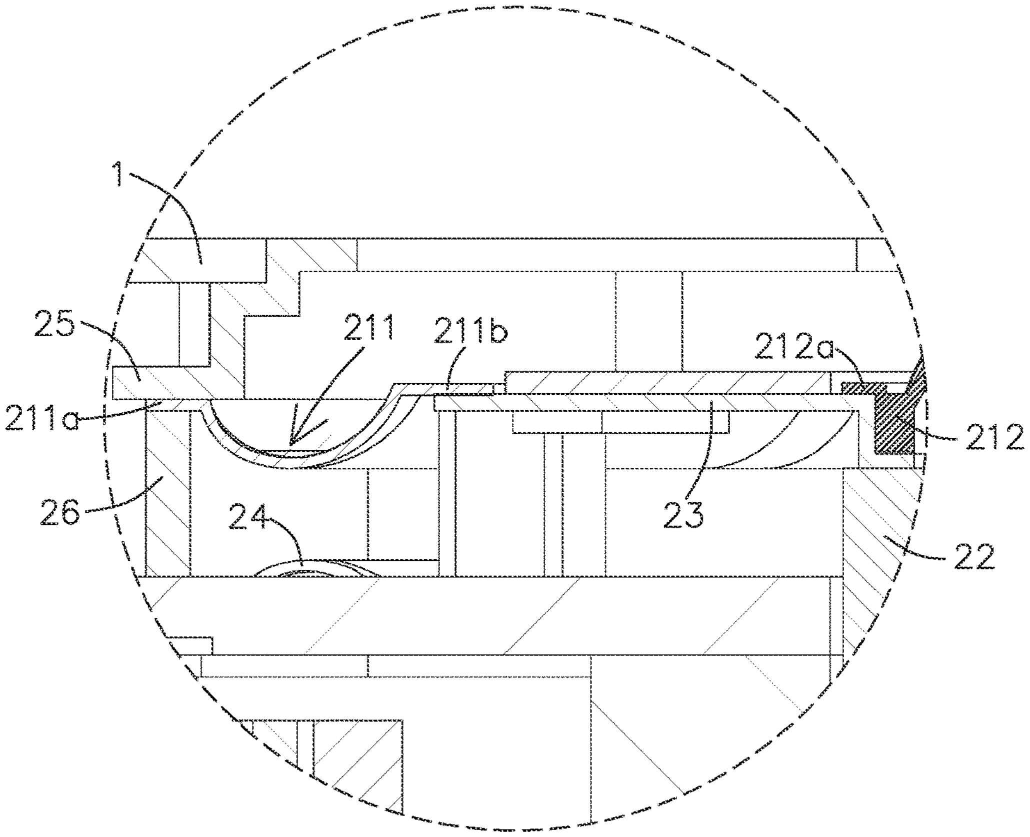
FIG. 4 is an enlarged view of part I in FIG. 3.
Figure 5:
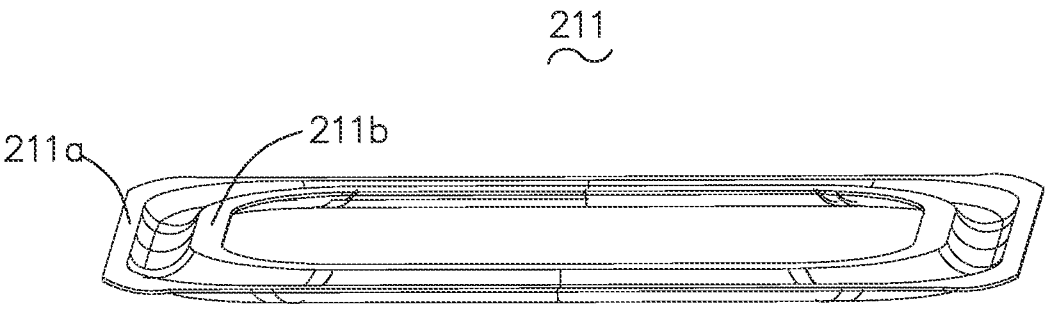
FIG. 5 is an isometric view of a first membrane in FIG. 2.
Figure 6:
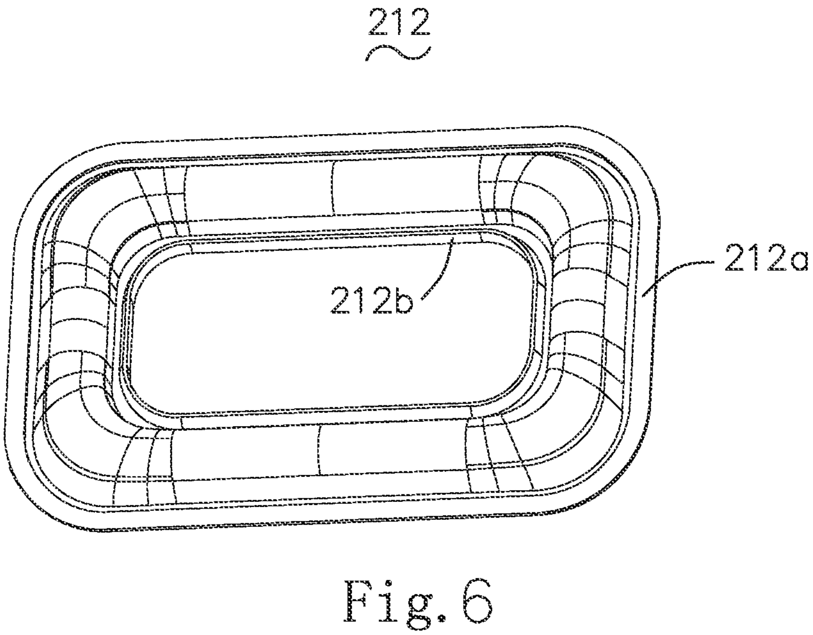
FIG. 6 is an isometric view of a second membrane in FIG. 2.
Figure 7:
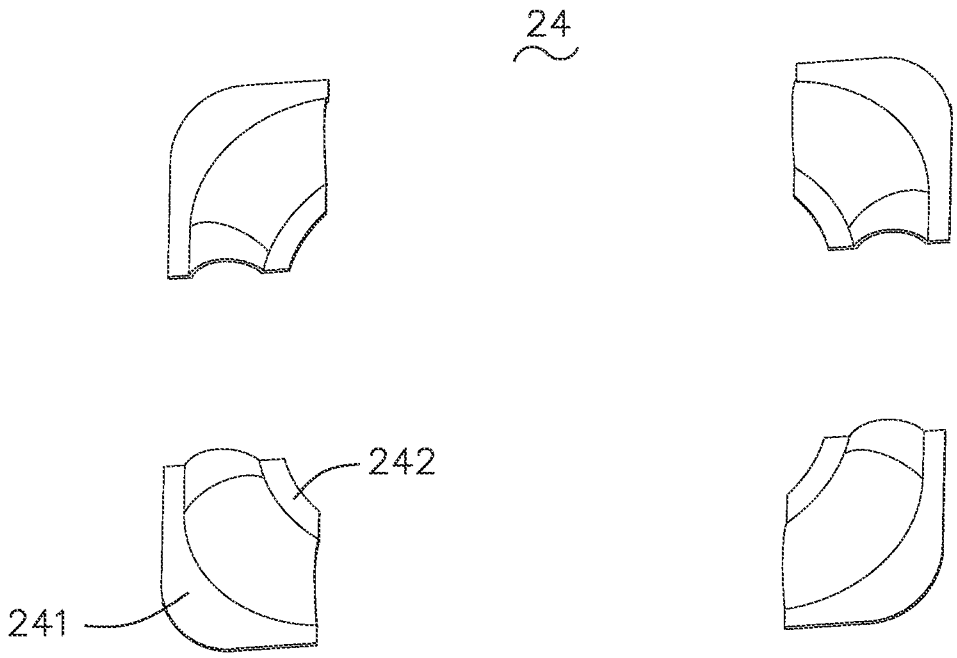
FIG. 7 is an isometric view of a vibration diaphragm in FIG. 2.
Figure 8:
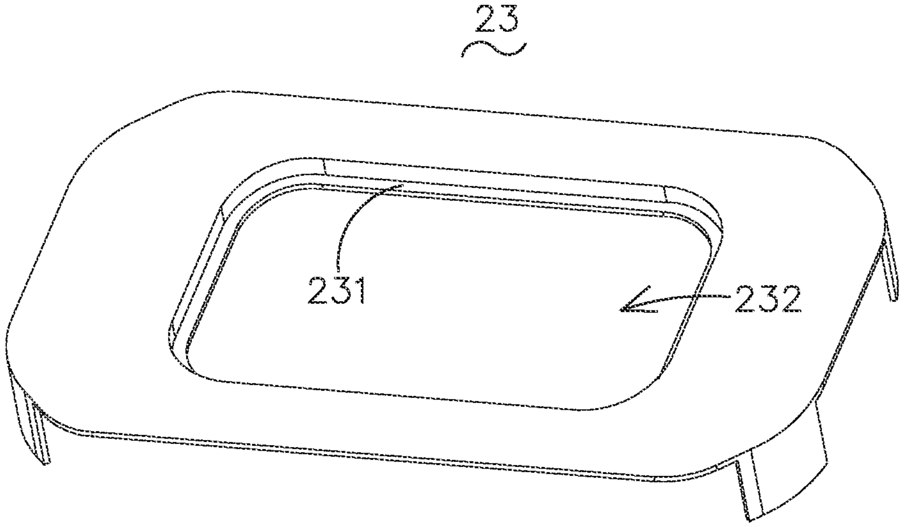
FIG. 8 is an isometric view of a skeleton in FIG. 2.

As shown in FIG. 2, the first vibration system 2 includes a sound membrane 21 and a voice coil 22. The sound membrane 21 includes a first membrane 211 and a second membrane 212, as shown in FIG. 5 and FIG. 6. The first membrane 211 is provided with a first connection part 211*a* and a second connection part 211*b*, and the second membrane 212 is provided with a third connection part 212*a* and a fourth connection part 212*b*. As shown in FIG. 2, along the first direction Z, the first vibration system 2 also includes an upper basin frame 25 and a lower basin frame 26 oppositely arranged, a vibration diaphragm 24 arranged opposite to the sound membrane 21, and a skeleton 23 arranged between the sound membrane 21 and the vibration diaphragm 24. As shown in FIG. 7, the vibration diaphragm 24 is provided with fifth connection part 241 and sixth connection part 242. As shown in FIG. 3 and FIG. 4, the first connection part 211*a* of the first membrane 211 is sandwiched between the upper basin frame 25 and the lower basin frame 26. The second connection part 211*b* of the first membrane 211 is connected to one end of the skeleton 23. The other end of skeleton 23 is connected with sixth connection part 242 of vibration diaphragm 24. The fifth connection part 241 of the vibration diaphragm 24 is connected to the inner side wall of the housing 1. Wherein, as shown in FIG. 8, the skeleton 23 is provided with an installation slot 231 and a through hole 232. The third connection part 212*a* of the second membrane 212 is connected to the voice coil 22 through the side wall of the installation slot 231. At least part of the upper magnet 45 is connected to the fourth connection part 212*b* of the second membrane 212 through the through hole 232.

In the embodiment of the application, when the multifunctional sounding device works, the voice coil 22 draws an alternating current from the outside. At this time, the voice coil 22 moves along the first direction Z under the action of the magnetic field generated by the main magnet 41 and the secondary magnet 42, and drives the sound membrane 21 to vibrate along the first direction Z through the skeleton 23, making the first vibration system 2 vibrate and sound.

Wherein, as shown in FIG. 2, the first vibration system 2 also includes a dome 27, which is fixed on the skeleton 23 and located between the first connection part 211*a* and the third connection part 212*a*. Through dome 27, the strength of skeleton 23 can be strengthened, the torsion resistance and anti-sway ability of skeleton 23 can be improved, and the acoustic performance of first vibration system 2 can be improved.

Figure 9:
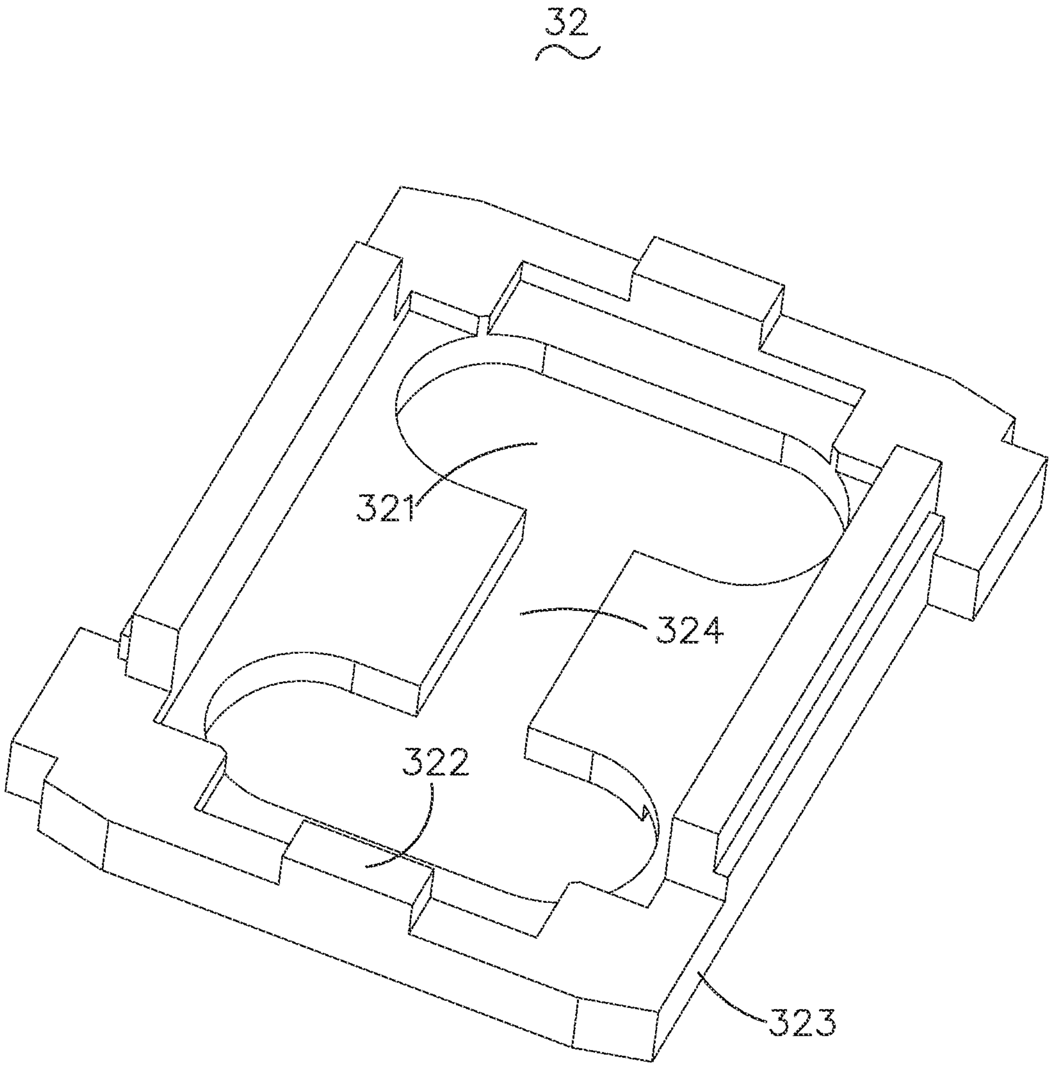
FIG. 9 is an isometric view of a weight in FIG. 2.

As shown in FIG. 2, second vibration system 3 includes weight 32. As shown in FIG. 9, a second through hole 324 is formed through the bottom wall of the weight 32. The cover plate 13 protrudes toward the magnetic circuit system 4 corresponding to the position of the second through hole 324 to form a protruding platform 131. The magnetic circuit system 4 is fixed on the protruding platform 131 to simplify the installation of the magnetic circuit system 4. The second vibration system 3 further includes a drive coil 31, which is fixedly connected to the weight 32, so that the drive coil 31 drives the weight 32 to vibrate along the second direction X and/or along the third direction Y. A first through hole 321 is formed through the weight 32.

The drive coil 31 is accommodated in the first through hole 321 and disposed opposite to the magnetic circuit system 4 at a distance. As shown in FIG. 3, the drive coil 31 includes a first side edge 311 and a second side edge 312 arranged opposite to each other. Along the first direction Z, the first side edge 311 is arranged opposite to the main magnet 41, and the second side edge 312 is arranged opposite to the secondary magnet 42. As shown in FIG. 2, FIG. 10~FIG. 12, the deformation part 51 of elastic component 5 is connected to weight 32, and the installation part 52 of elastic component 5 is connected to the side wall of housing 1. When the second vibration system 3 moves along the second direction X and/or along the third direction Y, the elastic component 5 can undergo elastic deformation.

In the embodiment of the application, the drive coil 31 is accommodated in the first through hole 321, which can simplify the connection between the drive coil 31 and the weight 32, thereby reducing the internal space of the multifunctional sounding device occupied by the drive coil 31 and the weight 32. The side wall of the drive coil 31 can be in contact with the side wall of the first through hole 321. It can facilitate the drive coil 31 to drive the weight 32 to move, and avoid the problem that the drive coil 21 cannot drive the weight 32 to move due to the gap between the drive coil 31 and the weight 32. Thus, the sensitivity of the weight 32 movement is improved, which in turn improves the sensitivity and stability of the multifunctional sounding device.

When the multifunctional sounding device works, the drive coil 31 moves along the second direction X and/or along the third direction Y under the action of the magnetic field generated by the main magnet 41 and the secondary magnet 42, so that the second vibration system 3 vibrates. The magnetic circuit system 4 drives the weight 32 to move through the drive coil 31, which simplifies the structure of the magnetic circuit system 4 driving the second vibration system 3 to vibrate. Therefore, the structure of the multifunctional sounding device is simplified, and the production cost of the multifunctional sounding device is reduced.

When the second vibration system 3 vibrates, the elastic component 5 undergoes elastic deformation under the action of weight 32 and produces a rebound force. When the weight 32 removes the restriction on the elastic component 5 or the current direction changes, the rebound force generated by the elastic component 5 can drive the second vibration system 3 to reset, so as to facilitate the next movement of the second vibration system 3. Therefore, setting the elastic component 5 is beneficial to the multiple and continuous work of the second vibration system 3, thereby improving the working stability and performance of the second vibration system 3. This further improves the working stability of the multifunctional sounding device.

Connecting the elastic component 5 to the weight 32 can avoid connecting the elastic component 5 directly to the drive coil 31 and causing the drive coil 31 to fail to work properly, thereby improving the working stability of the drive coil 31 and further improving the working stability of the second vibration system 3. At the same time, the connection between the elastic component 5 and the second vibration system 3 can be simplified, so as to reduce the occupation of the internal space of the multifunctional sounding device.

More specifically, as shown in FIGS. 2 and 9, the weight 32 is arranged with a bottom wall 323 and a side wall 322 bent and extended in a curve and folded manner from the bottom wall 323 toward the first vibration system 2, and the elastic component is fixedly connected to the side wall 322.

In the embodiment of the application, elastic component 5 is fixedly connected to side wall 322, which can further simplify the connection form between elastic component 5 and weight 32. At the same time, it can increase the connection surface area between elastic component 5 and weight 32, thereby increasing the stability of the connection between elastic component 5 and weight 32, thereby improving the stability of the multifunctional sounding device.

Figure 10:
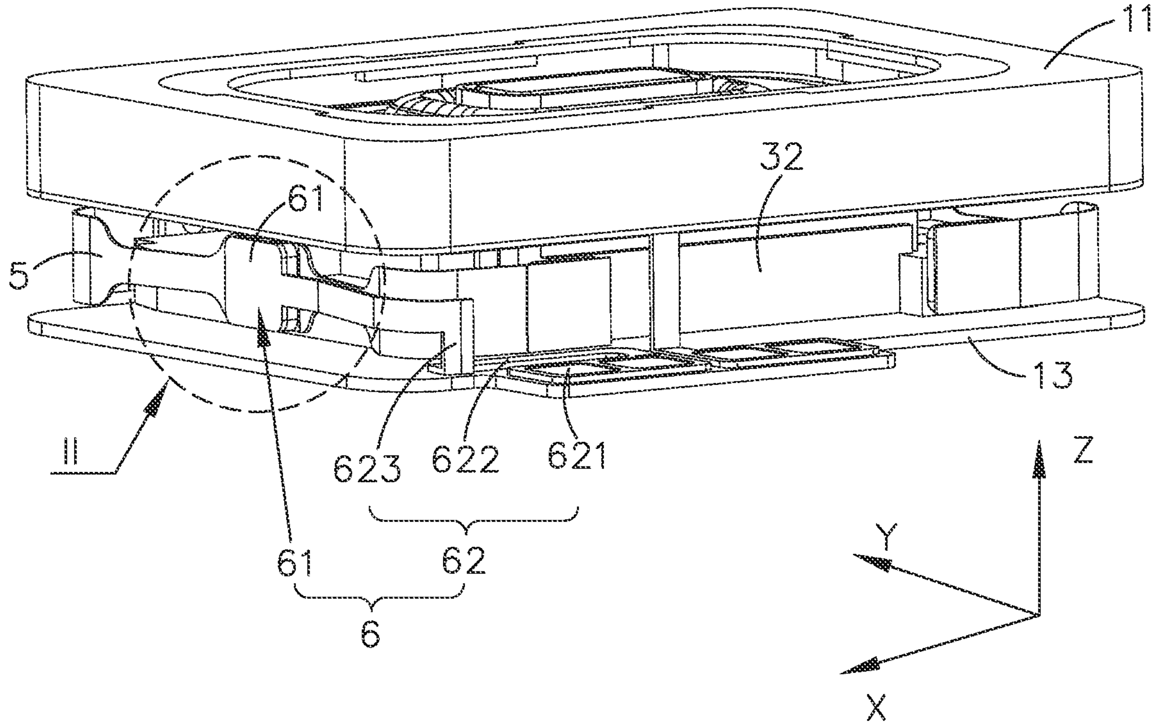
FIG. 10 an isometric view of the multifunctional sounding device with a second housing thereof removed.
Figure 11:
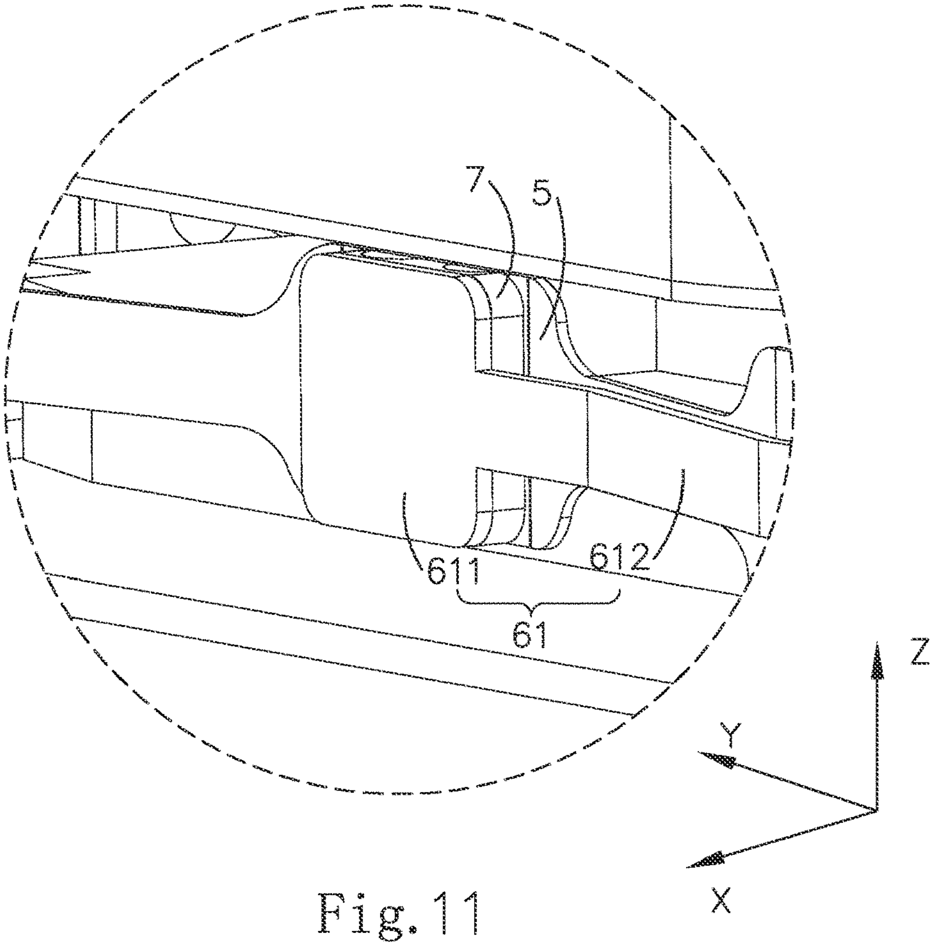
FIG. 11 is an enlarged view of part II in FIG. 10.
Figure 12:
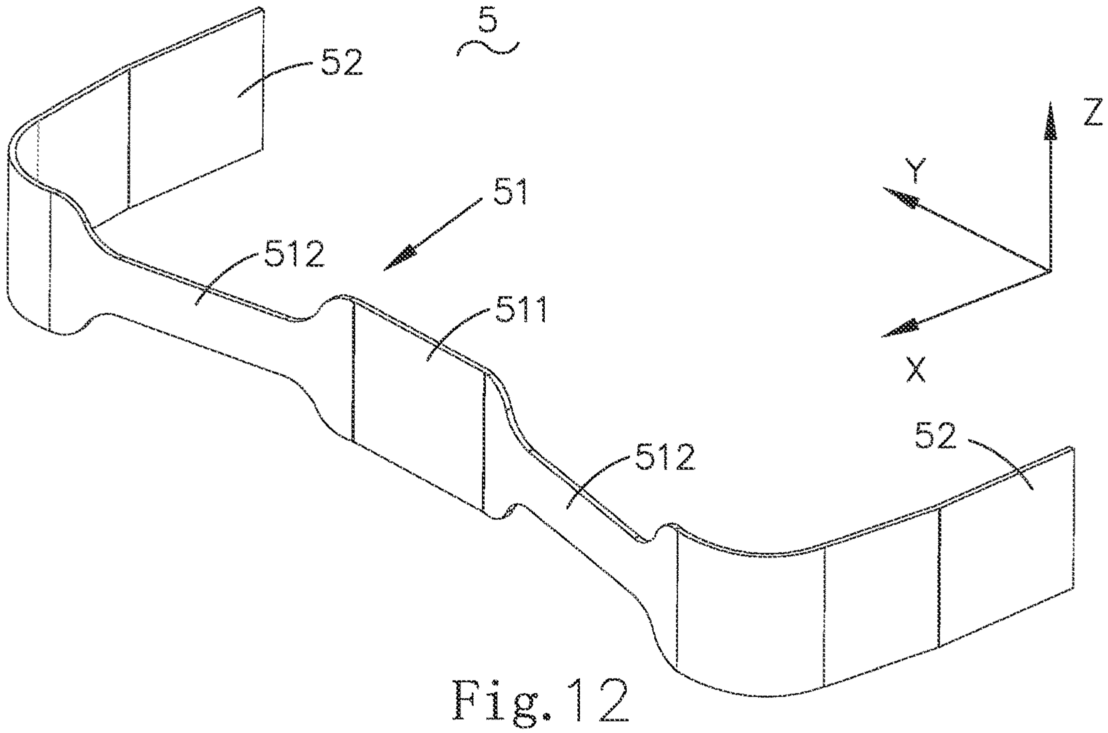
FIG. 12 is an isometric view of an elastic component in FIG. 2.

Specifically, as shown in FIG. 2, FIG. 10~FIG. 12, the deformation part 51 includes a fixed arm 511 fixed to the second vibration system 3 and an elastic arm part 512 extending from both ends of the fixed arm 511. When the second vibration system 3 moves along the second direction X and/or along the third direction Y, the fixed arm 511 can be driven to move relative to the first installation part 52 and the second installation part 53. Therefore, elastic deformation of elastic arm part 512 occurs under the action of installation part 52 and fixed arm 511. Wherein, as shown in FIG. 12, the width of the elastic arm part 512 along the first direction Z is smaller than the width of the fixed arm 511 and the installation part 52 along the first direction Z, so as to facilitate the stretching deformation of the elastic arm part 512.

In the embodiment of the application, the elastic component 5 is set with fixed arm 511, elastic arm part 512 and installation part 52, which simplifies the structure of elastic component 5 and facilitates the deformation of elastic component 5. Thus, the production cost of elastic component 5 is reduced, and the working performance of elastic component 5 is improved.

In the embodiment of the application, the connection methods between the fixed arm 511, the elastic arm part 512 and the installation part 52 include but are not limited to detachable connection, welding, bonding, and integral molding. In the embodiment of the application, the fixed arm 511, elastic arm part 512 and installation part 52 are integrally formed to increase the stability of the overall structure of elastic component 5. Wherein, the elastic component 5 is U-shaped or W-shaped, so as to facilitate the processing of the elastic component 5 and reduce the production cost of the elastic component 5. In addition, elastic component 5 also considers other deformation structures, and the application does not make special restrictions on the specific structure and shape of elastic component 5.

In any of the above embodiments, the number of elastic components 5 is multiple, and the elastic components 5 are arranged symmetrically along the second direction X and/or the third direction Y, that is, the multiple elastic components 5 are evenly distributed around the second vibration system 3. The force on the second vibration system 3 is evenly distributed, avoiding the unstable movement of the second vibration system 3 caused by the unilateral force of the second vibration system 3, thereby improving the stability of the movement of the second vibration system 3, thereby improving the stability of the multifunctional sounding device.

More specifically, as shown in FIG. 2, FIG. 10, FIG. 11 and FIG. 13, the flexible circuit board 6 includes an attached part 61 that is attached to the deformation part 51 and an extension part 62 that is bent and extended from the attached part 61 and is at least partially located outside the containment cavity, so as to facilitate the connection between the flexible circuit board 6 and the external electronic components. The attached part 61 includes a fixed part 611 fixed to the fixed arm 511 and a connection arm 612 extending from one end of the fixed part 611 and attached to the elastic arm part 512.

In the embodiment of the application, the fixed part 611 of the flexible circuit board 6 is fixedly connected to the fixed arm 511, and the connection arm 612 is attached to the elastic arm part 512. The connection surface area between the flexible circuit board 6 and the elastic component 5 is increased, thereby increasing the stability of the connection between the flexible circuit board 6 and the elastic component 5. At the same time, the increase of the connection surface area can improve the decoupling effect on the vibration of the elastic component 5. Attaching the flexible circuit board 6 to the elastic component 5 can increase the damping of the elastic component 5, thereby effectively reducing the force of the elastic component 5 when it vibrates and increasing the life of the elastic component 5.

Wherein, the width of the connection arm 612 along the first direction Z is less than or equal to the width of the elastic arm part 512 along the first direction Z, which reduces the risk that the connection arm 612 is damaged by local force caused by the connection arm 612 being wider than the elastic arm part 512. Thus, the working stability of the flexible circuit board 6 is improved, and the service life of the flexible circuit board 6 is prolonged.

Figure 13:
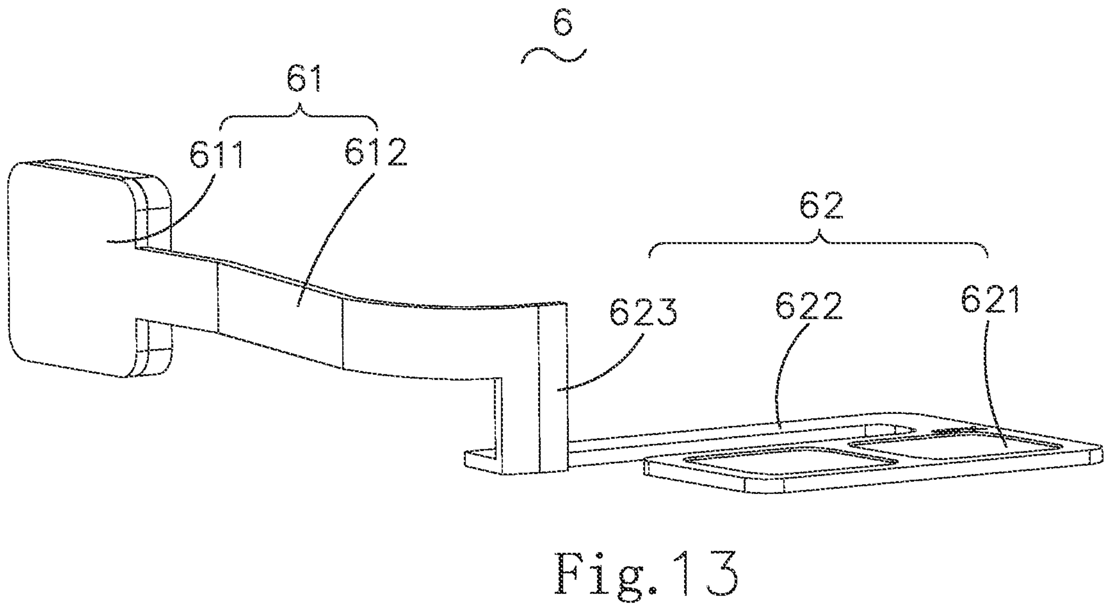
FIG. 13 is a partial structural diagram of a flexible circuit board in FIG. 2.

In addition, as shown in FIG. 13, the extension part 62 of the flexible circuit board 6 includes a first bending part 621 located outside the containment cavity 14, a second bending part 622 connected to the first bending part 621 and extending in a curve and folded manner along the second direction X, and a third bending part 623 connected to the second bending part 622 and extending in a folded manner along the first direction Z. The connection arm 612 of the attached part 61 is connected to the end of the third bending part 623 away from the second bending part 622.

In the embodiment of the application, the connection arm 612 and the first bending part 621 are connected through the second bending part 622 and the third bending part 623 in turn, which simplifies the structure of the flexible circuit board 6 and increases the diversity of the installation positions of the first bending part 621. Thus, the variety of connection modes between the flexible circuit board 6 and the external electronic components is increased, thereby increasing the scope of application of the flexible circuit board 6.

More specifically, as shown in FIG. 2, FIG. 10 and FIG. 11, the multifunctional sounding device further includes a connection component 7, and the flexible circuit board 6 and the elastic component 5 are connected through the connection component 7.

In the embodiment of the application, the connection between the flexible circuit board 6 and the elastic component 5 is through the connection component 7, which can simplify the connection between the flexible circuit board 6 and the elastic component 5, thereby reducing the number of parts required when connecting the flexible circuit board 6 and the elastic component 5. Further, the occupation of the internal space of the multifunctional sounding device by the flexible circuit board 6 and the elastic component 5 is reduced, so as to improve the integration and performance of the multifunctional sounding device.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A multifunctional sounding device, including:

a housing with a containment cavity;

a first vibration system movable along a first direction relative to the housing;

a second vibration system connected to the housing and movable along a second direction and/or in a third direction relative to the housing; the second direction being perpendicular to the first direction, and the third direction being perpendicular to both the first direction and the second direction;

a magnetic circuit system connected with the housing for driving the first vibration system and the second vibration system;

an elastic component including a deformation part fixed on the second vibration system and an installation part extended from both ends of the deformation part and fixed on the housing for suspending the second vibration system in the containment cavity; and a flexible circuit board including an attached part attached to the deformation part and an extension part bent and extended from the attached part and at least partially located outside the containment cavity.

2. The multifunctional sounding device as described in claim 1, wherein the deformation part includes a fixed arm fixed to the second vibration system and an elastic arm part extending from both ends of the fixed arm; the attached part includes a fixed part fixed on the fixed arm and a connection arm extending from one end of the fixed part and attached to the elastic arm part; a width of the connection arm along the first direction is less than or equal to the width of the elastic arm part along the first direction.

3. The multifunctional sounding device as described in 1, wherein the extension part includes a first bending part located outside the containment cavity, a second bending part connected to the first bending part and extending in a curved and folded manner along the second direction part and a third bending part connected to the second bending part and extending in a curved and folded manner along the first direction; the attached part is connected to an end of the third bending part away from the second bending part.

4. The multifunctional sounding device as described in claim 1 further including a connection component, wherein the flexible circuit board and the elastic component are connected through the connection component.

5. The multifunctional sounding device as described in claim 4, wherein the attached part is fixed on the side of the deformation part away from the second vibration system, the connection component is arranged between the end of the attached part away from the extension part and the deformation part.

6. The multifunctional sounding device as described in claim 1, wherein the number of the elastic components is multiple, and along the second direction and/or along the third direction, the elastic components are symmetrically disposed.

7. The multifunctional sounding device as described in claim 1, wherein the second vibration system includes a drive coil and a weight, and the weight penetrates to form a first through hole; the drive coil is accommodated in the first through hole and is disposed opposite to the magnetic circuit system at a distance; the drive coil and the magnetic circuit system interact to drive the weight to vibrate along the second direction and/or along the third direction; the deformation part of the elastic component is fixed to the weight.

8. The multifunctional sounding device as described in claim 7, wherein the weight is arranged with a bottom wall and a side wall bent and extended in a curved and folded manner from the bottom wall toward the first vibration system, the deformation part of the elastic component part is fixed to the side wall.

9. The multifunctional sounding device as described in claim 8, wherein the housing includes a first housing, a second housing and a cover plate which are connected in sequence; the first housing, the second housing and the cover plate enclose the containment cavity; the bottom wall penetrates to form a second through hole; the cover plate protrudes toward the magnetic circuit system corresponding to the position of the second through hole to form a protruding platform; the magnetic circuit system is fixed on the protruding platform.

10. The multifunctional sounding device as described in claim 9, wherein the cover plate is provided with an extension part of cover plate extending outside the containment cavity, and the extension part is fixed on the extension part of cover plate.

* * * * *